United States Patent
Nakano et al.

(10) Patent No.: US 9,507,023 B2
(45) Date of Patent: Nov. 29, 2016

(54) OBSTACLE DETECTION DEVICE FOR VEHICLE AND OBSTACLE DETECTION SYSTEM FOR VEHICLE

(71) Applicant: Panasonic Intellectual Property Management Co., Ltd., Osaka (JP)

(72) Inventors: Fumitake Nakano, Mie (JP); Naoya Azuma, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/772,380

(22) PCT Filed: Feb. 27, 2014

(86) PCT No.: PCT/JP2014/001068
§ 371 (c)(1),
(2) Date: Sep. 2, 2015

(87) PCT Pub. No.: WO2014/136408
PCT Pub. Date: Sep. 12, 2014

(65) Prior Publication Data
US 2016/0003943 A1 Jan. 7, 2016

(30) Foreign Application Priority Data

Mar. 4, 2013 (JP) .................. 2013-042058

(51) Int. Cl.
*G01S 15/93* (2006.01)
*G08G 1/16* (2006.01)
(Continued)

(52) U.S. Cl.
CPC ............. *G01S 15/931* (2013.01); *G01S 15/50* (2013.01); *G01S 15/87* (2013.01); *G08G 1/166* (2013.01); *G01S 2015/465* (2013.01); *G01S 2015/938* (2013.01); *G08G 1/04* (2013.01)

(58) Field of Classification Search
CPC .... G01S 15/42; G01S 15/876; G01S 15/878; G01S 15/931; G01S 2015/465; G01S 2015/932; G01S 2015/938; G08G 1/166
See application file for complete search history.

(56) References Cited

U.S. PATENT DOCUMENTS 4,636,996 A * 1/1987 Tsuji .................... G01S 15/931
367/107
4,967,860 A * 11/1990 Kremser ................ G01S 15/87
180/169

(Continued)

FOREIGN PATENT DOCUMENTS

JP          06317662 A   * 11/1994
JP      2002162461 A   *  6/2002

(Continued)

OTHER PUBLICATIONS

Google machine translation of WO 2012-034612 A1 (original WO document published Mar. 22, 2012).*

(Continued)

*Primary Examiner* — Behrang Badii
*Assistant Examiner* — David Testardi
(74) *Attorney, Agent, or Firm* — McDermott Will & Emery LLP (57) ABSTRACT

An operation unit calculates a position of an obstacle with respect to a vehicle using a first distance and a second distance. The first distance is a distance to the obstacle measured by a first ultrasonic sensor (ultrasonic sensor) having a first microphone (microphone) at a first timing. The second distance is a distance to the obstacle measured by a second ultrasonic sensor (ultrasonic sensor) having a second microphone (microphone) at a second timing which is later than the first timing.

15 Claims, 8 Drawing Sheets

(51) Int. Cl.
  *G01S 15/87* (2006.01)
  *G01S 15/50* (2006.01)
  *G08G 1/04* (2006.01)
  *G01S 15/46* (2006.01)

(56) References Cited

U.S. PATENT DOCUMENTS

| | | | | |
|---|---|---|---|---|
| 5,872,536 | A * | 2/1999 | Lyons | B60R 21/013 342/107 |
| 6,289,282 | B1 * | 9/2001 | Hassler | B60Q 9/006 342/455 |
| 6,396,435 | B1 * | 5/2002 | Fleischhauer | G01S 15/42 342/126 |
| 6,522,288 | B1 * | 2/2003 | Paradie | G01S 13/08 342/145 |
| 6,628,227 | B1 * | 9/2003 | Rao | G01S 13/931 342/70 |
| 7,349,820 | B2 * | 3/2008 | Gotzig | G01S 15/46 701/300 |
| 2005/0088334 | A1 * | 4/2005 | Herder | G01S 7/527 342/70 |
| 2007/0273490 | A1 * | 11/2007 | Fuchs | B60K 31/0008 340/435 |
| 2009/0254260 | A1 | 10/2009 | Nix et al. | |
| 2009/0326819 | A1 | 12/2009 | Taguchi | |
| 2010/0141414 | A1 * | 6/2010 | Matsumoto | B60Q 9/007 340/435 |
| 2012/0296523 | A1 * | 11/2012 | Ikeda | B60R 1/00 701/41 |
| 2013/0162461 | A1 * | 6/2013 | Lucking | G01S 15/878 342/70 |

FOREIGN PATENT DOCUMENTS

| | | | |
|---|---|---|---|
| JP | 2006-216066 A | | 8/2006 |
| JP | 2007112297 A | * | 5/2007 |
| JP | 2007-192763 A | | 8/2007 |
| JP | 2008-225583 A | | 9/2008 |
| JP | 2010-197931 A | | 9/2010 |
| JP | 2011-220860 A | | 11/2011 |
| WO | WO 9201954 A1 | * | 2/1992 ............. G01S 15/06 |
| WO | WO 2012/034612 A1 | * | 3/2012 |
| WO | 2012/140769 A1 | | 10/2012 |

OTHER PUBLICATIONS

International Search Report dated Jun. 3, 2014 issued in International Patent Application No. PCT/JP2014/001068 (English translation thereof).

Extended European Search Report dated Mar. 18, 2016 issued in European Patent Application No. 14761108.1.

\* cited by examiner

OBSTACLE DETECTION DEVICE FOR VEHICLE AND OBSTACLE DETECTION SYSTEM FOR VEHICLE

RELATED APPLICATIONS

This application is the U.S. National Phase under 35 U.S.C. §371 of International Application No. PCT/JP2014/001068, filed on Feb. 27, 2014 which in turn claims the benefit of Japanese Patent Application No. 2013-042058 filed on Mar. 4, 2013, the disclosures of which applications are incorporated by reference herein.

TECHNICAL FIELD

The present invention relates to obstacle detection devices for vehicle and obstacle detection systems for vehicle, and more specifically to an obstacle detection device for vehicle and an obstacle detection system for vehicle to detect an obstacle of a vehicle.

BACKGROUND ART

Conventionally, an obstacle detection system for vehicle that is disposed in a vehicle for detecting the presence of an obstacle has been available. Normally the obstacle detection system for vehicle includes one ultrasonic sensor that includes one microphone to transmit/receive an ultrasonic wave (a so-called "single sonar"). This ultrasonic sensor detects a presence of an obstacle by transmitting an ultrasonic wave from the microphone and receiving the ultrasonic wave reflected by the obstacle. Moreover, the ultrasonic sensor measures the distance to the obstacle based on the time difference from the transmission to the reception of the ultrasonic wave.

In this obstacle detection system for vehicle however, the distance information from a vehicle to an obstacle can be acquired using the ultrasonic sensor, but the direction of the obstacle with respect to the vehicle cannot be acquired, therefore the positional information of the obstacle with respect to the vehicle cannot be acquired.

To solve this problem, there is an ultrasonic sensor where a microphone to transmit/receive an ultrasonic wave and a microphone dedicated to receiving an ultrasonic wave are integrated, and the distance and angle of the obstacle are calculated using trigonometric functions (a so called "dual sonar") (e.g. see JP 2006-216066 A (hereafter called "Document 1")).

However, a problem is that the detectable distance (distance for which an obstacle can be detected) is shorter when using an ultrasonic sensor having two microphones (dual sonar) compared with an ultrasonic sensor having one microphone (single sonar).

SUMMARY OF INVENTION

With the foregoing in view, it is an object of the present invention to provide an obstacle detection device for vehicle and an obstacle detection system for vehicle that can calculate a position of an obstacle with respect to a vehicle throughout a range from a short distance to a long distance.

An obstacle detection device for vehicle according to an aspect of the present invention includes an operation unit. The operation unit is configured to calculate a position of an obstacle with respect to a vehicle at a second timing using first distance information and second distance information. The first distance information indicates a first distance which a first ultrasonic sensor measured at a first timing. The first ultrasonic sensor includes a first microphone to be disposed on an outer surface of the vehicle. The ultrasonic sensor is configured to measure the first distance from the vehicle to the obstacle by the first microphone transmitting/receiving an ultrasonic wave. The second distance information indicates a second distance which a second ultrasonic sensor measured at the second timing, which is later than the first timing. The second ultrasonic sensor includes a second microphone to be disposed on the outer surface of the vehicle. The second ultrasonic sensor is configured to measure the second distance from the vehicle to the obstacle by the second microphone transmitting/receiving an ultrasonic wave.

In this obstacle detection device for vehicle, it is preferable that the operation unit includes a moving distance calculation unit, a sensor interval calculation unit, a moving angle calculation unit and an obstacle direction calculation unit. The moving distance calculation unit is configured to calculate a moving distance of the vehicle from the first timing to the second timing based on the moving speed of the vehicle. The sensor interval calculation unit is configured to calculate a sensor interval based on the installation interval between the first ultrasonic sensor and the second ultrasonic sensor, and the moving distance calculated by the moving distance calculation unit. The sensor interval is an interval between the first ultrasonic sensor at the first timing and the second ultrasonic sensor at the second timing. The moving angle calculation unit is configured to calculate a moving angle of the second ultrasonic sensor from the first timing to the second timing, with a position of the first ultrasonic sensor at the first timing as the center, based on the sensor interval calculated by the sensor interval calculation unit. The obstacle direction calculation unit is configured to calculate the direction of the obstacle based on the first distance information, the second distance information, the sensor interval calculated by the sensor interval calculation unit, and the moving angle calculated by the moving angle calculation unit. The direction is a direction of the obstacle with respect to the second ultrasonic sensor at the second timing.

It is preferable that this obstacle detection device for vehicle further includes a communication unit. The communication unit is configured to transmit position information on the position calculated by the operation unit to the outside.

In this obstacle detection device for vehicle, it is preferable that the communication unit is configured to transmit the position information to the outside using controller area network communication.

In this obstacle detection device for vehicle, it is preferable that the communication unit is configured to transmit the position information to the outside using analog communication.

In this obstacle detection device for vehicle, it is preferable that the communication unit is configured to transmit the position information to an external apparatus disposed in the vehicle.

It is preferable that this obstacle detection device for vehicle further includes a prediction unit and a determination unit. The prediction unit is configured to predict a traveling route of the vehicle based on a steering angle of the vehicle. The determination unit is configured to determine whether the position calculated by the operation unit is included in the traveling route predicted by the prediction unit.

It is preferable that this obstacle detection device for vehicle further includes a prediction unit and a determination unit. The prediction unit is configured to predict the traveling route of the vehicle based on the steering angle of the vehicle. The determination unit is configured to determine whether the position calculated by the operation unit is included in the traveling route predicted by the prediction unit. The communication unit is configured to transmit the position information to the outside if the determined unit determines that the position is included in the traveling route. The communication unit is configured not to transmit the position information to the outside if the determination unit determines that the position is not included in the traveling route.

It is preferable that the obstacle detection device for vehicle further includes a coordinate calculation unit. The coordinate calculation unit is configured to calculate positional coordinates of the obstacle at the second timing based on the sensor interval and the direction calculated by the obstacle direction calculation unit.

In this obstacle detection device for vehicle, it is preferable that the operation unit performing the following operation after calculating the position at the second timing. The operation unit is configured to calculate the position at a third timing, which is later than the second timing, using the second distance information and third distance information. The third distance information indicates the first distance which the first ultrasonic sensor measured at the third timing.

In this obstacle detection device for vehicle, it is preferable that each of the first ultrasonic sensor and the second ultrasonic sensor includes the following configuration. The first ultrasonic sensor further includes a first housing that houses the first microphone. The second ultrasonic sensor further includes a second housing that houses the second microphone.

It is preferable that this obstacle detection device for vehicle is disposed in the vehicle.

An obstacle detection system for vehicle according to an aspect of the present invention includes a first ultrasonic sensor, a second ultrasonic sensor and an operation unit. The first ultrasonic sensor includes a first microphone to be disposed on an outer surface of a vehicle. The first ultrasonic sensor is configured to measure a first distance from the vehicle to an obstacle by the first microphone transmitting/receiving an ultrasonic wave. The second ultrasonic sensor includes a second microphone to be disposed on an outer surface of the vehicle. The second ultrasonic sensor is configured to measure a second distance from the vehicle to the obstacle by the second microphone transmitting/receiving an ultrasonic wave. The operation unit is configured to calculate a position of the obstacle with respect to the vehicle at a second timing using first distance information and second distance information. The first distance information indicates the first distance which the first ultrasonic sensor measured at a first timing. The second distance information indicates the second distance which the second ultrasonic sensor measured at the second timing, which is later than the first timing.

As described above, according to the present invention, the distance information to an obstacle measured by each of the plurality of ultrasonic sensors is computed using the plurality of ultrasonic sensors each including one microphone respectively, therefore the position of an obstacle with respect to the vehicle can be calculated throughout a range from a short distance to a long distance.

BRIEF DESCRIPTION OF DRAWINGS

Preferable embodiments according to the present invention will be described in more detail. Other features and advantages of the present invention will be better understood with reference to the following detailed description and the attached drawings.

DESCRIPTION OF EMBODIMENTS

Embodiments of the present invention will now be described with reference to the drawings.

(Embodiment)

Figure 1:
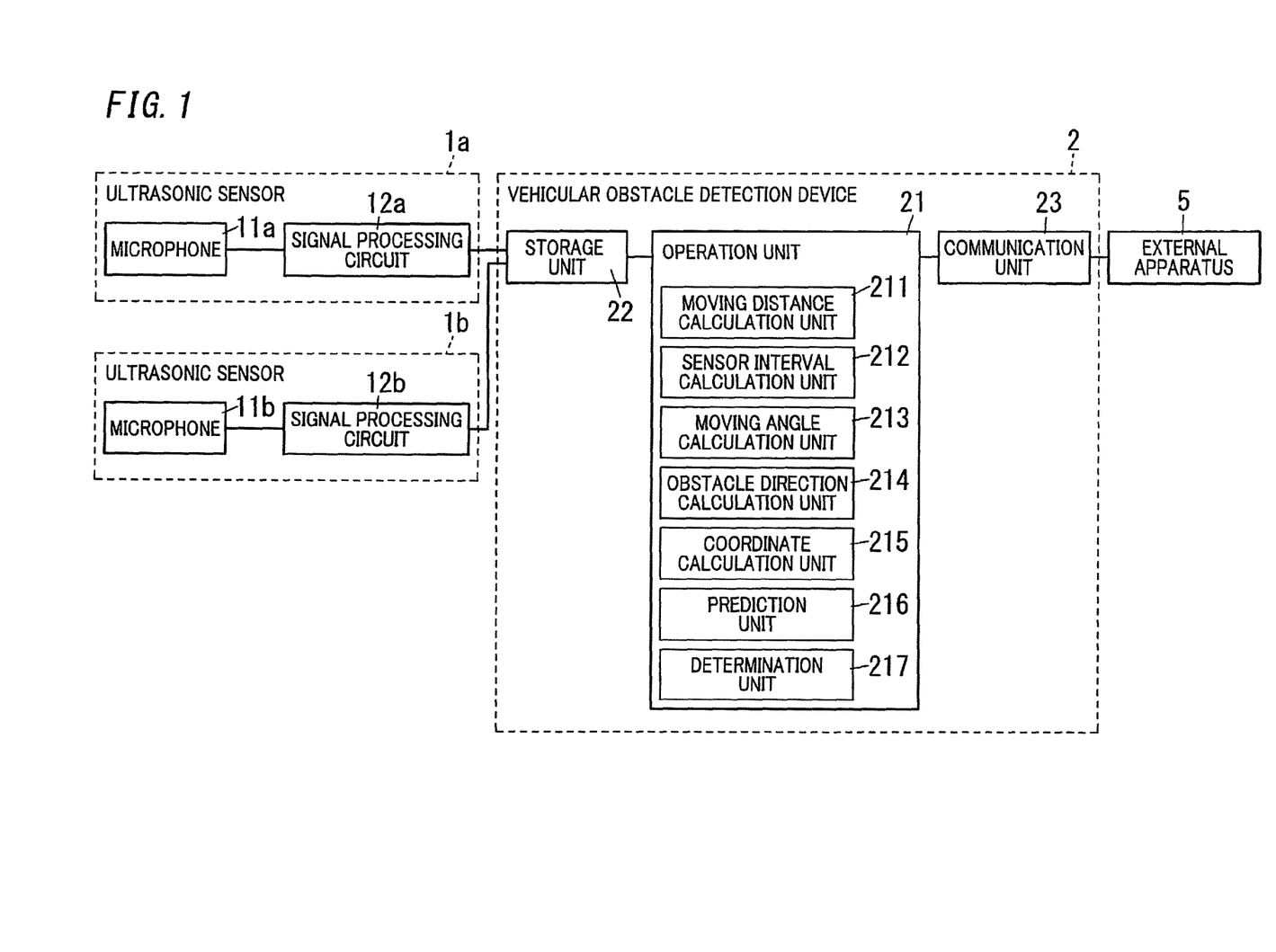
FIG. 1 is a block diagram of an obstacle detection system for vehicle according to an embodiment of the present invention.
Figure 2:
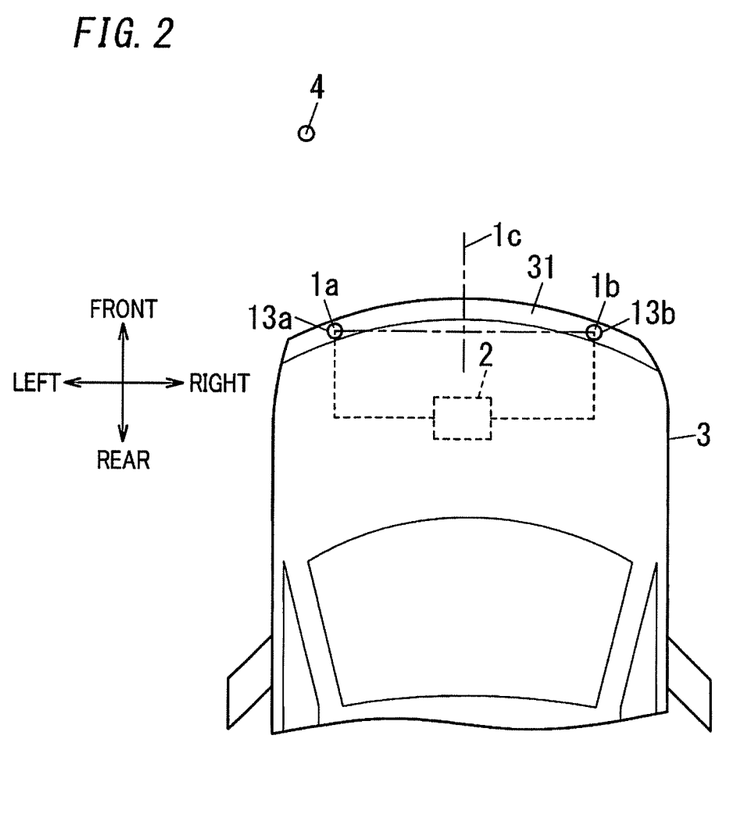
FIG. 2 is a diagram depicting a general configuration of the obstacle detection system for vehicle according to the embodiment of the present invention.

FIG. 1 is a block diagram of an obstacle detection system for vehicle of this embodiment, and FIG. 2 is a diagram depicting a general configuration thereof. The obstacle detection system for vehicle of this embodiment is constituted by two ultrasonic sensors 1a and 1b, and an obstacle detection device 2 for vehicle, and calculates a position of an obstacle 4 with respect to a vehicle 3.

As illustrated in FIG. 2, the ultrasonic sensors 1a and 1b are disposed on a bumper 31 on the front side of a vehicle 3. Specifically, the ultrasonic sensor 1a (first ultrasonic sensor 1 and the ultrasonic sensor 1b (second ultrasonic sensor) are independently disposed on the vehicle 3. The ultrasonic sensor 1a and the ultrasonic sensor 1b are disposed symmetrically with respect to a center line 1c, which passes through the center of the vehicle in the lateral direction, and extends along the longitudinal direction. When the vehicle is facing the traveling direction (advancing direction), the ultrasonic sensor 1a is disposed on the left side of the center line 1c of the vehicle 3 in the lateral direction, and the ultrasonic sensor 1b is disposed on the right side of the center line 1c of the vehicle 3 in the lateral direction.

The ultrasonic sensor 1a is a single sonar where a microphone 11a (first microphone) and a signal processing circuit 12a shown in FIG. 1 are housed in a housing 13a (first housing) shown in FIG. 2. In other words, the ultrasonic sensor 1a includes a microphone 11a, a signal processing circuit 12a and a housing 13a. The housing 13a houses the microphone 11a and the signal processing circuit 12a. The microphone 11a of this embodiment is an ultrasonic transducer configured to transmit/receive an ultrasonic wave. The microphone 11a is disposed so as to be exposed from a hole created in the bumper 31 (see FIG. 2), and transmits an ultrasonic wave toward the front direction of the vehicle 3. If an obstacle 4 exists, the microphone 11a receives an ultrasonic wave reflected by the obstacle 4. The signal processing circuit 12a measures (calculates) the distance from the microphone 11a to the obstacle 4 based on the time difference from the timing when the microphone 11a transmitted the ultrasonic wave to the timing when the microphone 11a receives the ultrasonic wave reflected by the obstacle 4. Then the signal processing circuit 12a stores the distance information on the measured distance (distance from the microphone 11a to the obstacle 4) into a storage unit 22 of the obstacle detection device 2 for vehicle. Here the ultrasonic sensor 1a measures the distance from the microphone 11a to the obstacle 4 at a predetermined cycle by transmitting the ultrasonic wave from the microphone 11a at the predetermined cycle. Then the ultrasonic sensor 1a sequentially stores the measurement data, linking the measured distance information on the distance to the obstacle 4 and the time when the distance was measured (timing), in the storage unit 22. The microphone 11a may integrally have both the transmission configuration to transmit the ultrasonic wave and the reception configuration to receive the ultrasonic wave reflected by the obstacle 4, or may have the transmission configuration (transmitter) and the reception configuration (receiver) independently in a proximate state.

The ultrasonic sensor 1b is a single sonar where a microphone 11b (second microphone) and a signal processing circuit 12b shown in FIG. 1 are housed in a housing 13b (second housing) shown in FIG. 2. In other words, the ultrasonic sensor 1b includes the microphone 11b, the signal processing circuit 12b and the housing 13b. The housing 13b houses the microphone 11b and the signal processing circuit 12b. The microphone 11b of this embodiment is an ultrasonic transducer configured to transmit/receive an ultrasonic wave. The configuration of the ultrasonic sensor 1b (microphone 11b, signal processing circuit 12b) is the same as the configuration of the ultrasonic sensor 1a (microphone 11a, signal processing circuit 12a), hence a detailed description is omitted. The microphone 11b may integrally have both the transmission configuration to transmit the ultrasonic wave and the reception configuration to receive the ultrasonic wave reflected by the obstacle 4, or may have a transmission configuration (transmitter) and the reception configuration (receiver) independently in a proximate state.

In this embodiment, the ultrasonic sensor 1a and the ultrasonic sensor 1b alternately measure the distance to the obstacle 4 by the microphone 11a of the ultrasonic sensor 1a and the microphone 11b of the ultrasonic sensor 1b alternately transmitting an ultrasonic wave. The measurement time difference between the ultrasonic sensor 1a and the ultrasonic sensor 1b is assumed to be C1 [ms].

The obstacle detection device 2 for vehicle includes an operation unit 21, a storage unit 22 and a communication unit 23. The obstacle detection device 2 for vehicle is disposed in the vehicle 3.

As mentioned above, the storage unit 22 stores the measurement data linking the distance information on the distance to the obstacle 4 measured by the ultrasonic sensor 1a (first distance) and the time when the distance was measured (timing). In other words, the storage unit 22 stores first distance information that indicates the first distance which the ultrasonic sensor 1a measured at a first timing (time t1). The storage unit 22 also stores the measurement data linking the distance information on the distance to the obstacle 4 measured by the ultrasonic sensor 1b (second distance) and the time when the distance was measured (timing). In other words, the storage unit 22 stores second distance information that indicates the second distance which the ultrasonic sensor 1b measured at a second timing (time t2), which is later than the first timing. The storage unit 22 corresponds to the first acquisition unit that acquires the first distance information from the ultrasonic sensor 1a and the second acquisition unit that acquires the second distance information from the ultrasonic sensor 1b. A clock unit that clocks the timing to measure the distance from the vehicle 3 to the obstacle 4 may be disposed in the ultrasonic sensors 1a and 1b, or may be disposed in the obstacle detection device 2 for vehicle. If the clock unit is disposed in the ultrasonic sensors 1a and 1b, the signal processing circuits 12a and 12b have the function of the clock unit. If the clock unit is disposed in the obstacle detection device 2 for vehicle, the operation unit 21 has the function of the clock unit.

The operation unit 21 is constituted by a microcomputer having a moving distance calculation unit 211, a sensor interval calculation unit 212, a moving angle calculation unit 213, an obstacle direction calculation unit 214, a coordinate calculation unit 215, a prediction unit 216, and a determination unit 217. The operation unit 21 calculates the position of the obstacle 4 with respect to the vehicle 3 by performing arithmetic processing using trigonometric functions.

The communication unit 23 is a communication interface to communicate with the outside. More specifically, the communication unit 23 is a communication interface to perform CAN (Controller Area Network) communication with an external apparatus 5 (e.g. an ECU (Electronic Control Unit)) disposed in the vehicle 3.

Now the arithmetic processing by the operation unit 21 will be described with reference to FIG. 3 to FIG. 8. In FIG. 3 to FIG. 8, it is assumed that the lateral direction of the vehicle 3 is the x axis direction, the longitudinal direction of the vehicle 3 is the y axis direction, and the front end of the vehicle 3 (bumper 31) at the center in the lateral direction of the vehicle 3 is the origin O1, where the x axis and the y axis orthogonally cross.

In FIG. 3 to FIG. 8, it is assumed that the obstacle 4 exists diagonally left forward of the vehicle 3. The vehicle 3 is traveling forward (y axis direction) at the moving speed S1 [km/h]. The broken line indicates a position of the vehicle 3 when the ultrasonic sensor 1a measured the distance D1 [mm] to the obstacle 4 at time t1 (first timing). The solid line indicates a position of the vehicle 3 when the ultrasonic sensor 1b measured the distance D2 [mm] to the obstacle 4 at time t2 (second timing) when the measurement time difference C1 elapsed from time t1.

The operation unit 21 calculates the positional coordinates of the obstacle 4 with the front end (origin O1) of the vehicle 3 as the origin, using the measurement data (distance D1, time t1) of the ultrasonic sensor 1a and the measurement data (distance D2, time t2) of the ultrasonic sensor 1b stored in the storage unit 22. In other words, the operation unit 21 calculates the position of the obstacle 4 with respect to the vehicle 3 at time t2 (second timing) using the first distance information and the second distance information.

Figure 3:
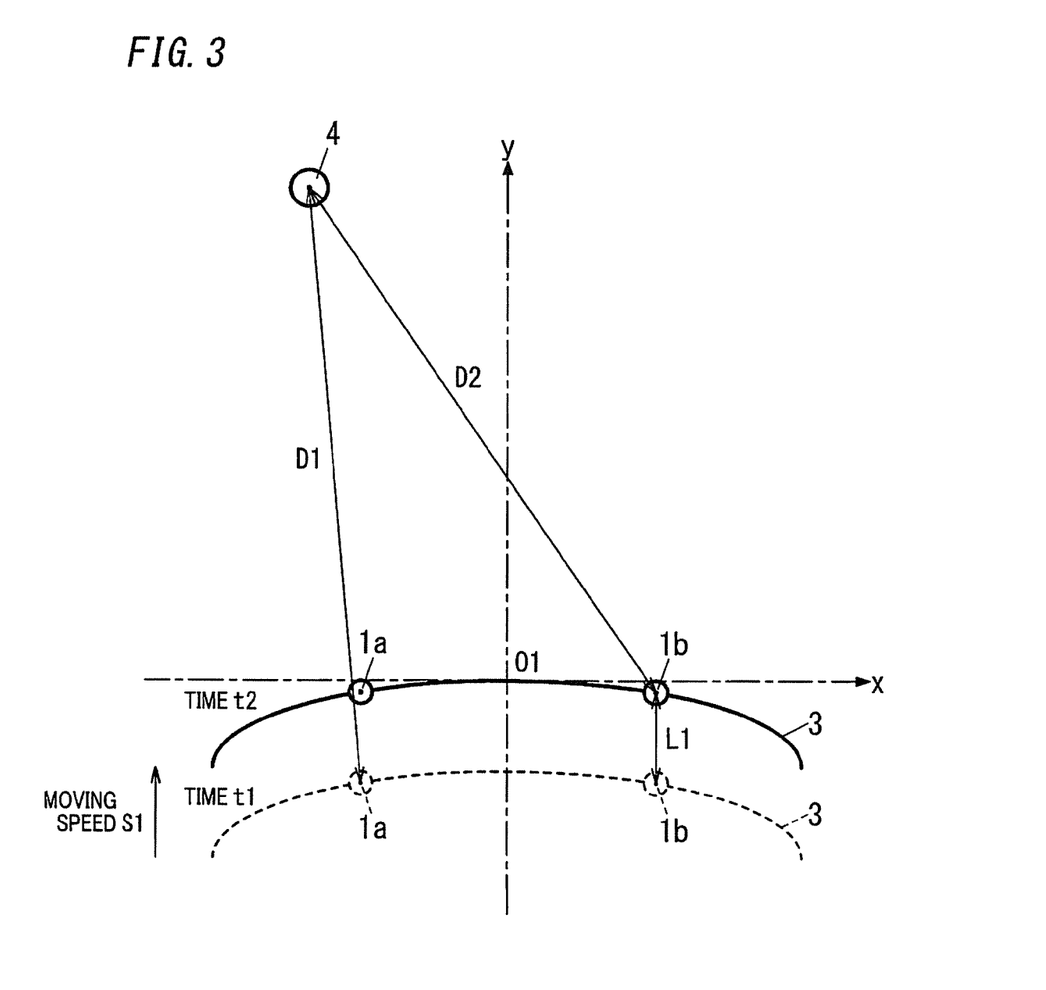
FIG. 3 is a diagram depicting an operation of a moving distance calculation unit according to the embodiment of the present invention.

First the arithmetic processing of the moving distance calculation unit 211 of the operation unit 21 will be described with reference to FIG. 3. The moving distance calculation unit 211 calculates the moving distance L1 [mm]

of the vehicle 3 from time t1 to time t2 (measurement time difference C1). Here the operation unit 21 acquires the vehicle speed information (moving speed S1) from an external ECU using the communication unit 23. The information on the measurement time difference C1 between the ultrasonic sensor 1a and the ultrasonic sensor 1b is held by the moving distance calculation unit 211 in advance. Then the moving distance calculation unit 211 calculates the moving distance L1 [mm] using the measurement time difference C1 [ms] which is held in advance, and the acquired moving speed S1 [km/h] (see FIG. 3 and the following Expression (1)).

[Expression 1]

$$L1 = \frac{S1 \times 10^6}{60 \times 60 \times 10^3} \times C1 \qquad (1)$$

Figure 4:
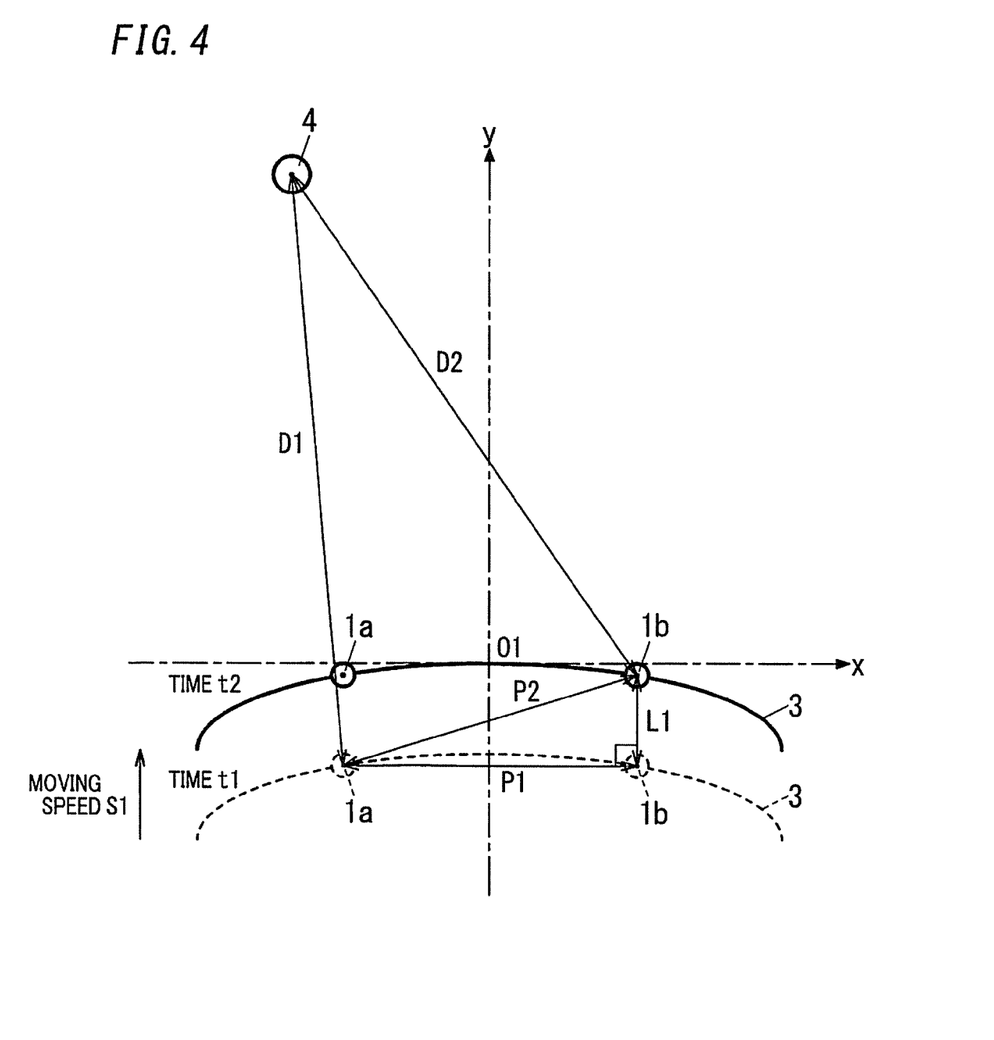
FIG. 4 is a diagram depicting an operation of a sensor interval calculation unit according to the embodiment of the present invention.

Now the arithmetic processing of the sensor interval calculation unit 212 of the operation unit 21 will be described with reference to FIG. 4. The sensor interval calculation unit 212 calculates the interval between the position of the ultrasonic sensor 1a at time t1 and the position of the ultrasonic sensor 1b at time t2 (sensor interval P2 [mm]). The ultrasonic sensor 1a and the ultrasonic sensor 1b are installed symmetrically with respect to the center axis in the lateral direction (y axis) of the vehicle 3, and the installation interval of the ultrasonic sensor 1a and the ultrasonic sensor 1b is assumed to be P1 [mm]. The information on this installation interval P1 is held by the sensor interval calculation unit 212 in advance. The sensor interval calculation unit 212 calculates the sensor interval P2 [mm] using the installation interval P1 [mm] that is held in advance, and the moving distance L1 [mm] calculated by the moving distance calculation unit 211 (see FIG. 4 and the following Expressions (2) and (3)).

[Expression 2]

$$P2^2 = P1^2 + L1^2 \qquad (2)$$

[Expression 3]

$$P2 = \sqrt{P1^2 + L1^2} \qquad (3)$$

Now the arithmetic processing by the moving angle calculation unit 213 of the operation unit 21 will be described with reference to FIG. 5. The moving angle calculation unit 213 calculates the moving angle θ1 [°] of the ultrasonic sensor 1b generated by the movement of the vehicle 3 from time t1 to time t2 with the position of the ultrasonic sensor 1a at time t1 as the center. The moving angle calculation unit 213 calculates the moving angle θ1 [°] using the sensor interval P2 [mm] calculated by the sensor interval calculation unit 212 and the installation interval P1 [mm] that is held in advance (see FIG. 5 and the following Expressions (4) and (5)). In other words, based on the sensor interval P2 [mm] calculated by the sensor interval calculation unit 212, the moving angle calculation unit 213 calculates the moving angle θ1 [°] of the ultrasonic sensor 1b from time t1 to time t2 with the position of the ultrasonic sensor 1a at time t1 as the center.

[Expression 4]

$$\cos\theta1 = \frac{P1}{P2} \qquad (4)$$

[Expression 5]

$$\theta1 = \cos^{-1}\frac{P1}{P2} \qquad (5)$$

Figure 5:
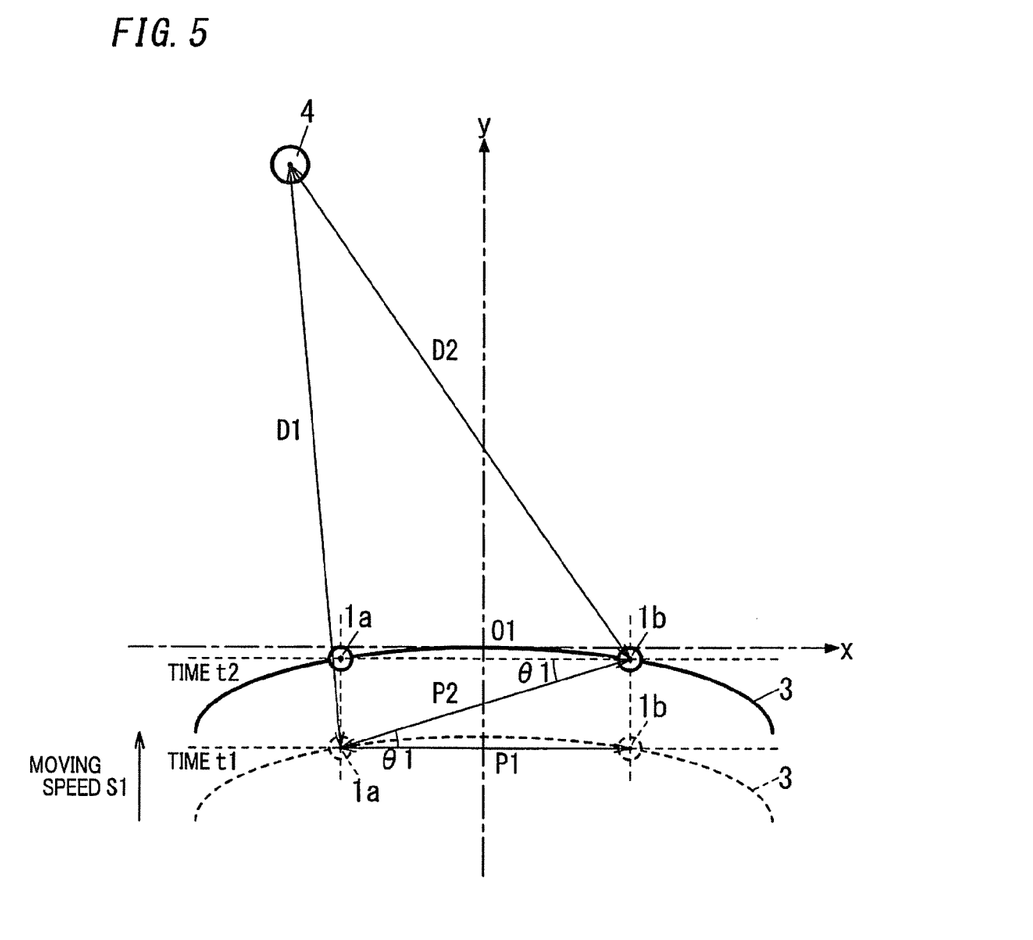
FIG. 5 is a diagram depicting an operation of a moving angle calculation unit according to the embodiment of the present invention.

Here as shown in FIG. 5, the moving angle of the ultrasonic sensor 1a, generated by the movement of the vehicle from time t1 to t2 with the position of the ultrasonic sensor 1b at time t2 as the center also becomes θ1.

Now the arithmetic processing by the obstacle direction calculation unit 214 of the operation unit 21 will be described with reference to FIG. 6. The obstacle direction calculation unit 214 calculates the direction of the obstacle 4 viewed from the ultrasonic sensor 1b. The direction of the obstacle 4 viewed from the ultrasonic sensor 1b refers to an angle θ2 [°] of the obstacle 4 with respect to the ultrasonic sensor 1b at time t2, based on the position of the ultrasonic sensor 1a at time t2 and the axis B1 (parallel with x axis) that passes through the position of the ultrasonic sensor 1b. First the obstacle direction calculation unit 214 calculates an angle θ3 [°] formed by: a line A1 connecting a position of the ultrasonic sensor 1b at time t2 and a position of the ultrasonic sensor 1a at time t1; and a line A2 connecting a position of the ultrasonic sensor 1b and a position of the obstacle 4 at time t2. The obstacle direction calculation unit 214 calculates the angle θ3 using the distance D1 measured by the ultrasonic sensor 1a, the distance D2 measured by the ultrasonic sensor 1b, and the sensor interval P2 calculated by the sensor interval calculation unit 212 (see FIG. 6 and the following Expressions (6) and (7)).

[Expression 6]

$$\cos\theta3 = \frac{P2^2 + D2^2 - D1^2}{2 \times P2 \times D2} \qquad (6)$$

[Expression 7]

$$\theta3 = \cos^{-1}\left(\frac{P2^2 + D2^2 - D1^2}{2 \times P2 \times D2}\right) \qquad (7)$$

Figure 6:
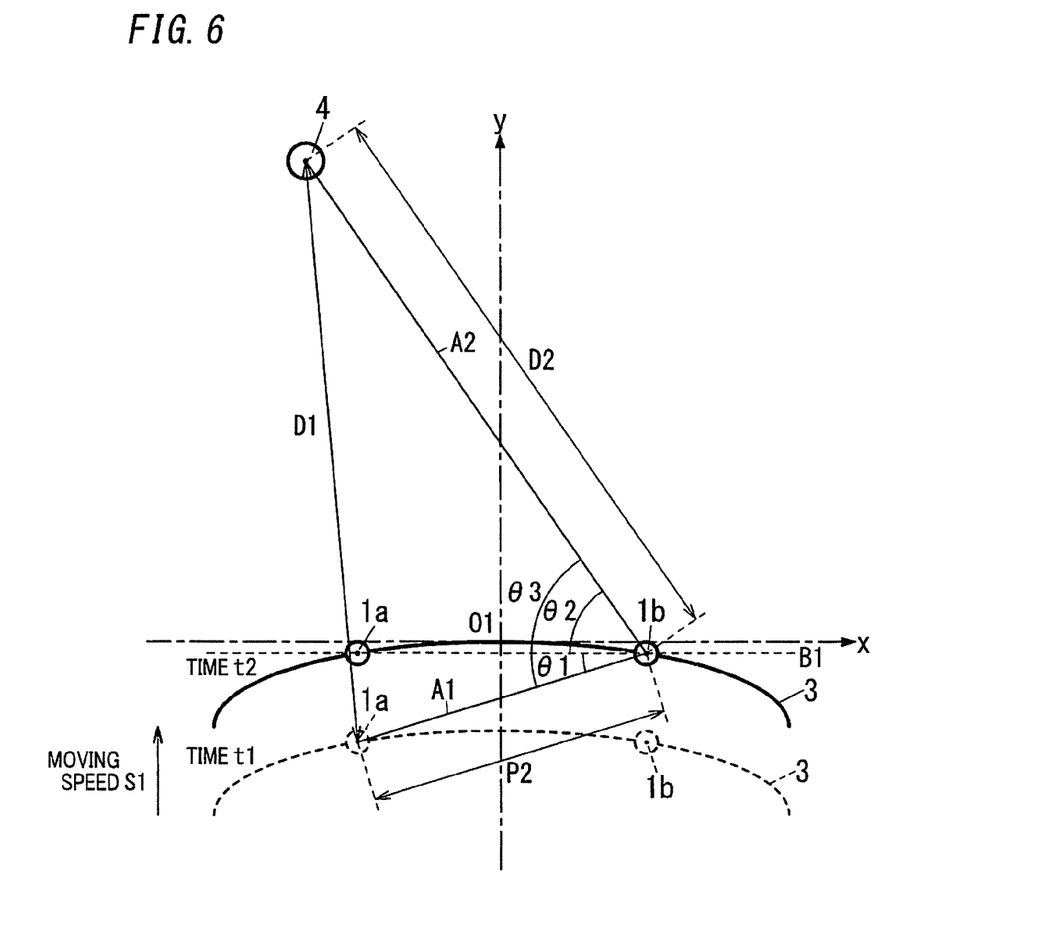
FIG. 6 is a diagram depicting an operation of an obstacle direction calculation unit according to the embodiment of the present invention.

Here the angle θ3 is the sum of the moving angle θ1 and the angle θ2, as shown in FIG. 6. Therefore the obstacle direction calculation unit 214 calculates the angle θ2 by subtracting the moving angle θ1 from the angle θ3 calculated by the above Expressions (6) and (7) (see FIG. 6 and the following Expression (8)).

[Expression 8]

$$\theta2 = \cos^{-1}\left(\frac{P2^2 + D2^2 - D1^2}{2 \times P2 \times D2}\right) - \theta1 \qquad (8)$$

By the obstacle direction calculation unit 214 calculating the angle θ2, the position of the obstacle 4 (distance 2 and angle θ2), with respect to the ultrasonic sensor 1b at time t2, is specified. In other words, the obstacle direction calculation unit 214 calculates the direction of the obstacle 4 based on the first distance information, the second distance information, the sensor interval P2 [mm], and the moving angle θ1 [°].

Figure 7:
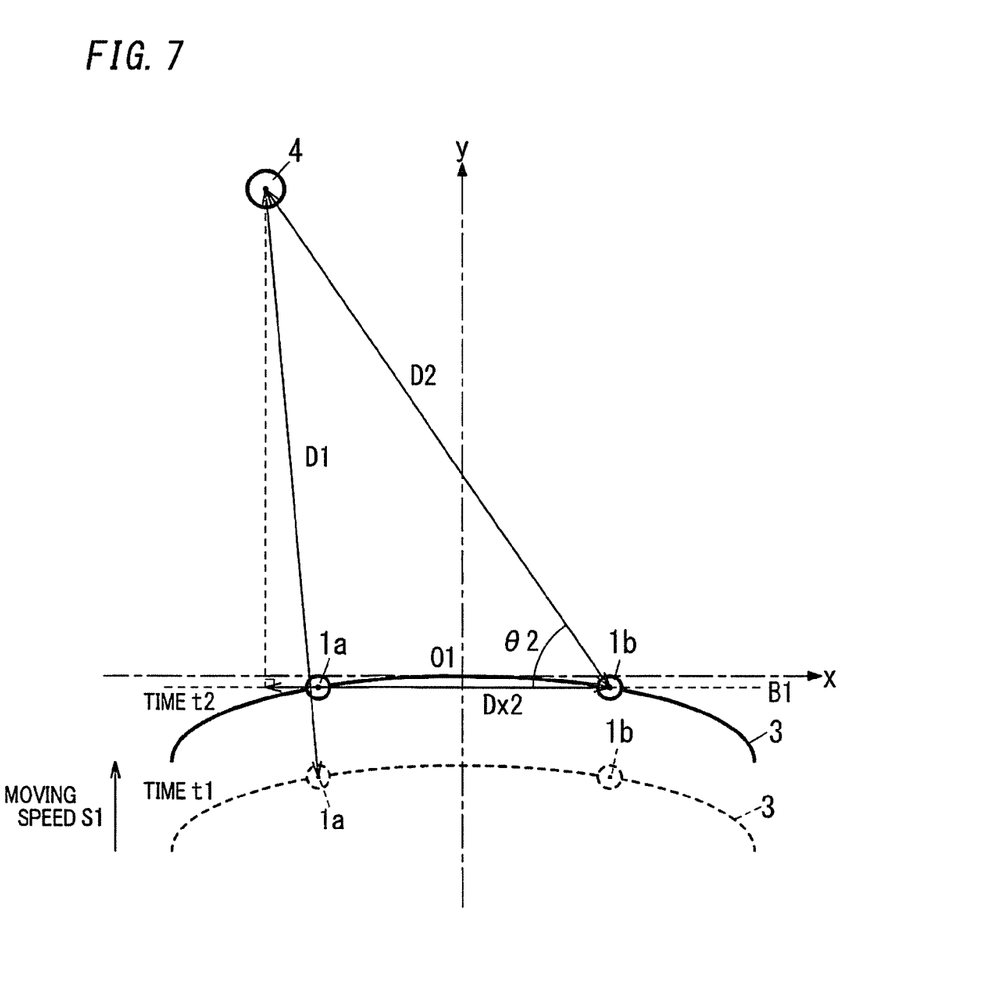
FIG. 7 is a diagram depicting an operation of a coordinate calculation unit according to the embodiment of the present invention.
Figure 8:
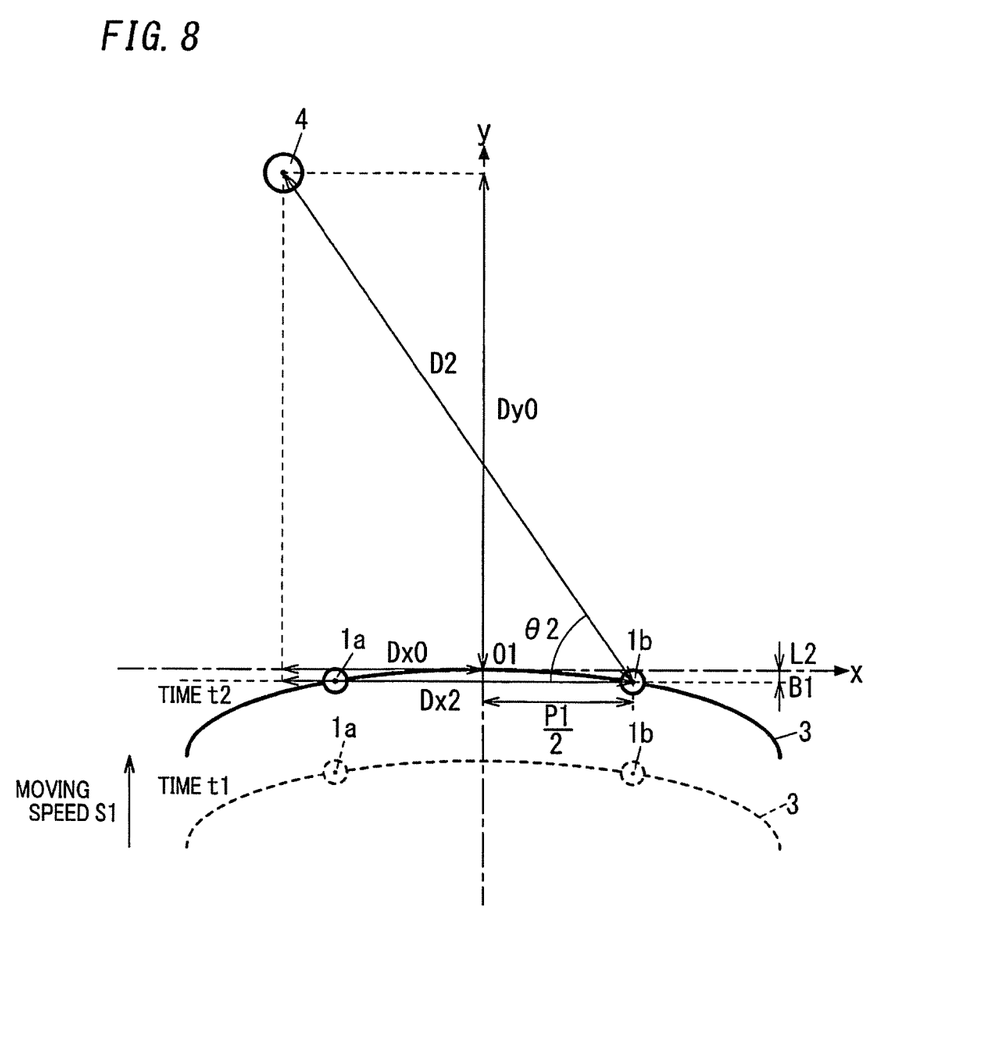
FIG. 8 a diagram depicting an operation of the coordinate calculation unit according to the embodiment of the present invention.

Now the arithmetic processing by the coordinate calculation unit 215 of the operation unit 21 will be described with reference to FIG. 7 and FIG. 8. The coordinate calculation unit 215 calculates the positional coordinates of the obstacle 4 with the front end (origin O1) of the vehicle 3 at time t2 as the origin. The positional coordinates of the obstacle 4 refers to the distance Dx0 [mm] of the obstacle 4 with respect to the origin O1 and the distance Dy0 [mm] of the obstacle 4 in the y axis direction with respect to the origin O1 (see FIG. 8). If the obstacle 4 is at the left of the y axis, the distance Dx0 is expressed as a negative value.

First the coordinate calculation unit 215 calculates the distance Dx2 [mm] of the obstacle 4 in the x axis direction with respect to the ultrasonic sensor 1b at time t2. The coordinate calculation unit 215 calculates the distance Dx2 using the following Expression (9) if the angle θ2 calculated by the obstacle direction calculation unit 214 is 90° or less (see FIG. 7). The coordinate calculation unit 215 calculates the distance Dx2 using the following Expression (10) if the angle θ2 calculated by the obstacle direction calculation unit 214 is greater than 90° (see FIG. 7).

[Expression 9]

$$Dx2 = \cos\theta 2 \times D2 \quad (9)$$

[Expression 10]

$$Dx2 = \cos(180°-\theta 2) \times D2 \quad (10)$$

Then the coordinate calculation unit 215 calculates the distance Dx0 from the front end (origin O1) of the vehicle 3 in the x axis direction to the obstacle 4 using the distance Dx2 calculated by the above Expression (9) or (10). The coordinate calculation unit 215 calculates the distance Dx0 (Dx0≤0) using the following Expression (11) if the angle θ2 calculated by the obstacle direction calculation unit 214 is 90° or less (see FIG. 8). The coordinate calculation unit 215 calculates the distance Dx0 (Dx0>0) using the following Expression (12) if the angle θ2 calculated by the obstacle direction calculation unit 214 is greater than 90° (see FIG. 8).

[Expression 11]

$$Dx0 = \frac{P1}{2} - Dx2 \quad (11)$$

[Expression 12]

$$Dx0 = \frac{P1}{2} + Dx2 \quad (12)$$

Then the coordinate calculation unit 215 calculates the distance Dy0 from the front end (origin O1) of the vehicle 3 in the y axis direction to the obstacle 4. The bumper 31, where the ultrasonic sensors 1a and 1b are disposed, is a curved surface of which apex is the front end. The length (offset) from the ultrasonic sensor 1b to the front end of the vehicle 3 (bumper 31) in the y axis direction is L2 [mm]. The information on this length L2 is held by the coordinate calculation unit 215 in advance. The coordinate calculation unit 215 calculates the distance Dy0 using the distance Dx2 calculated by the above expression (9) or (10), the distance D2 measured by the ultrasonic sensor 1b and the length L2 that is held in advance (see FIG. 8 and the following Expressions (13) and (14).

[Expression 13]

$$(Dy0+L2)^2 = D2^2 - Dx2^2 \quad (13)$$

[Expression 14]

$$Dy0 = \sqrt{D2^2 - Dx2^2} - L2 \quad (14)$$

The coordinate calculation unit 215 of the operation unit 21 calculates the positional coordinates (Dx0, Dy0) of the obstacle 4 with respect to the front end (origin O1) of the vehicle 3 at time t2 using the above Expressions (9) to (14). In other words, the coordinate calculation unit 215 calculates the positional coordinates of the obstacle 4 at time t2 based on the sensor interval and the direction calculated by the obstacle direction calculation unit 214.

Then the operation unit 21 transmits the position information (positional coordinates (Dx0, Dy0) of the obstacle 4, calculated by the coordinate calculation unit 215, to an external apparatus 5, using the communication unit 23. In other words, the communication unit 23 transmits the position information of the obstacle 4 to the outside (external apparatus 5). Then the position of the obstacle 4, with respect to the vehicle 3, is notified to the driver using a signal lamp or the like installed in the vehicle 3.

Thus according to this embodiment, the positional coordinates (Dx0, Dy0) of the obstacle 4 can be calculated using the distance (distances D1 and D2) to the obstacle 4 which the two ultrasonic sensors 1a and 1b measured at different timings (time t1 and time t2). Therefore according to this embodiment, the driver can be notified not only about the presence of the obstacle 4, but also about the position information of the obstacle 4 with respect to the vehicle 3, hence more accurate driving support can be provided to the driver. Furthermore, in this embodiment, steering information is not used for calculating the positional coordinates of the obstacle 4, therefore arithmetic processing is simplified.

The dual sonar used for a conventional obstacle detection system for vehicle integrally has two microphones, which means that the interval of the two microphones is short and the detection distance (distance where the obstacle 4 can be detected) is short. However in this embodiment, the ultrasonic sensor 1a has one microphone 11a and the ultrasonic sensor 1b has one microphone 11b, and each of the ultrasonic sensors 1a and 1b is constituted by single sonar respectively. The ultrasonic sensor 1a and the ultrasonic sensor 1b are independent from each other, and the installation interval P1 can be freely set, hence the position of the obstacle 4 with respect to the vehicle 3 can be calculated throughout a range from a short distance to a long distance. Moreover, in this embodiment, single sonars (ultrasonic sensors 1a and 1b) having high versatility are used, which is advantageous over the dual sonar in terms of cost.

In the case of a configuration using one single sonar, as in the case of a conventional obstacle detection system for vehicle, the position of an obstacle 4 cannot be specified, hence the presence of the obstacle 4 is notified to the driver even if the obstacle 4 is located in a region where it is impossible for the vehicle 3 to contact the obstacle. In other words, the presence of the obstacle 4 is notified to the driver even in the case of detecting the obstacle 4 located in a region where the vehicle 3 will never enter. Therefore conventionally the position and angle to dispose the ultrasonic sensor must be adjusted, or mask processing is required to physically limit the detection range.

In this embodiment however, the positional coordinate of an obstacle 4 can be specified, as mentioned above, and furthermore, the operation unit 21 includes a prediction unit 216 and a determination unit 217.

The operation unit 21 acquires the steering information (steering angle) of the vehicle 3 using the communication unit 23. The prediction unit 216 predicts a traveling route of the vehicle 3 based on the acquired steering information.

The determination unit 217 determines whether the positional coordinates of the obstacle 4, calculated by the coordinate calculation unit 215, is included in the traveling route of the vehicle 3 predicted by the prediction unit 216. If the positional coordinates of the obstacle 4 is included in the traveling route of the vehicle 3, the determination unit 217 notifies the driver that there is a possibility of collision between the vehicle 3 and the obstacle 4, by sounding a buzzer or turning an alarm lamp ON via the communication unit 23, and induces the driver to avoid collision. In other words, if the determination unit 217 determines that the position of the obstacle 4 is included in the traveling route, the communication unit 23 transmits the position information of the obstacle 4 to an external apparatus 5.

If the determination unit 217 determines that the position of the obstacle 4 is not included in the traveling route, on the other hand, the communication unit 23 does not transmit this position information to the outside. Thus according to this embodiment, a region where it is impossible for the vehicle 3 to contact an obstacle is set, and if an obstacle 4 exists in this region, the presence of the obstacle 4 is not notified. In other words, if an obstacle 4 is located in a region where the vehicle 3 will never enter, the above mentioned notification is not performed. Therefore according to this embodiment, unnecessary notification to the driver can be prevented, and moreover, there is no limit in the installation of the ultrasonic sensor unlike prior art, and mask processing to physically limit the detection range is not required.

Furthermore, according to this embodiment, the position of the obstacle 4 is calculated using the moving distance L1 of the vehicle 3 (see the above Expression (1)), even when the vehicle 3 is moving, hence there is no error caused by the movement of the vehicle 3, and accuracy of calculating the position of the obstacle 4 is high.

Further, according to this embodiment, the operation unit 21 calculates the position of the obstacle 4 using the measurement data of the ultrasonic sensor 1a and the measurement data of the ultrasonic sensor 1b after the measurement time difference C1 has elapsed from measurement by the ultrasonic sensor 1a. However, the sequence of time of the measurement data by the ultrasonic sensor 1a and the measurement data by the ultrasonic sensor 1b is not limited to this sequence. For example, the operation unit 21 may calculate the position of the obstacle 4 using the measurement data by the ultrasonic sensor 1b and the measurement data by the ultrasonic sensor 1a after the measurement time difference C1 has elapsed from measurement by the ultrasonic sensor 1b.

Further, the operation unit 21 may calculate the position of the obstacle 4 using the latest measurement data of the ultrasonic sensor 1a or 1b, and the measurement data of the ultrasonic sensor 1b or 1a before this latest measurement data by the measurement time difference C1.

In other words, the operation unit 21 may repeat the following operation. First, the operation unit 21 calculates the position of the obstacle 4 using the measurement data by the ultrasonic sensor 1a at time t1 (first timing), and the measurement data by the ultrasonic sensor 1b at time t2 (second timing) after the measurement time difference C1 has elapsed from time t1. Then the operation unit 21 calculates the position of the obstacle 4 using the measurement data by the ultrasonic sensor 1b at time t2, and the measurement data by the ultrasonic sensor 1a at a time after the measurement time difference C1 has elapsed from time t2 (third timing). Hereafter, the operation unit 21 repeats this operation.

In other words, the operation unit 21 may execute the following operation after calculating the position (position of obstacle 4) at the second timing (time t2). The operation unit 21 calculates the position of the obstacle 4 at the third timing, which is later than the second timing, using the second distance information and the third distance information. The third distance information indicates the first distance (distance from the vehicle 3 to the obstacle 4) which the first ultrasonic sensor (ultrasonic sensor 1a) measured at the third timing.

This configuration allows to calculate the position of the obstacle 4 at each measurement time difference C1, hence the update frequency of the position information of the obstacle 4 increases.

In this embodiment, the ultrasonic sensor 1a and the ultrasonic sensor 1b alternately measures the distance to the obstacle 4, but the ultrasonic sensor 1a and the ultrasonic sensor 1b may simultaneously measure the distance to the obstacle 4 periodically. In this case, the operation unit 21 calculates the position of the obstacle 4 by acquiring the measurement data, of which the measurement time difference between the ultrasonic sensor 1a and the ultrasonic sensor 1b is the measurement time difference C1, from the storage unit 22, and performing the arithmetic processing.

In other words, the operation unit 21 may execute the following operation. The operation unit 21 detects a position of the obstacle 4 at the second timing (time t2) using the first distance information and the second distance information. At this time, the operation unit 21 also calculates the position at the second timing using the third distance information and the fourth distance information. The third distance information indicates the first distance which the first ultrasonic sensor (ultrasonic sensor 1a) measured at the second timing. The fourth distance information indicates the second distance which the second ultrasonic sensor (ultrasonic sensor 1b) measured at the first timing (time t1).

The obstacle detection system for vehicle according to this embodiment is constituted by two ultrasonic sensors 1a and 1b, and calculates the position of the obstacle 4 using the measurement data by the two ultrasonic sensors 1a and 1b, but may further include a plurality of ultrasonic sensors. In this case, the operation unit 21 calculates a position of the obstacle 4 by appropriately combining the measurement data of any two ultrasonic sensors out of the plurality of ultrasonic sensors. By disposing many ultrasonic sensors, the detection range of the obstacle 4 can be widened. In this embodiment, the ultrasonic sensors 1a and 1b are disposed in the front side bumper 31 of the vehicle 3, but the position where the ultrasonic sensors 1a and 1b are installed is not limited to this position, and may be installed at the rear side bumper of the vehicle 3, for example.

The communication unit 23 of this embodiment is the communication interface corresponding to CAN communication, but is not limited to CAN communication. For example, the communication unit 23 may be constituted by an interface corresponding to such analog communication as a serial interface, and may communicate with an external apparatus 5. In other words, the communication unit 23 may transmit the positional information of the obstacle 4 to the outside using analog communication. For another example, the communication unit 23 may be an interface that corresponds to both CAN communication and analog communication. In this example, the communication unit 23 transmits the position information to the outside using either CAN communication or analog communication.

Although the present invention has been described with reference to some preferred embodiments, numerous modifications and variations can be made by those skilled in the art without departing from the true spirit and scope, that is the claims, of the present invention.

The invention claimed is:

1. An obstacle detection system for vehicle, comprising:
   a first ultrasonic sensor that comprises a first microphone to be disposed on an outer surface of a vehicle, and is configured to measure a first distance from the vehicle to an obstacle by the first microphone transmitting/receiving an ultrasonic wave;
   a second ultrasonic sensor that comprises a second microphone to be disposed on the outer surface of the vehicle, and is configured to measure a second distance from the vehicle to the obstacle by the second microphone transmitting/receiving an ultrasonic wave; and
   an operation unit realized by a processor and configured to calculate a position of the obstacle with respect to the vehicle at a second timing, which is later than a first timing, using first distance information that indicates the first distance measured by the first ultrasonic sensor at the first timing, and second distance information that indicates the second distance measured by the second ultrasonic sensor at the second timing,
   wherein the operation unit comprises:
     a moving distance calculation unit configured to calculate a moving distance of the vehicle from the first timing to the second timing based on a moving speed of the vehicle;
     a sensor interval calculation unit configured to calculate a sensor interval between the first ultrasonic sensor at the first timing and the second ultrasonic sensor at the second timing based on an installation interval between the first ultrasonic sensor and the second ultrasonic sensor, and the moving distance calculated by the moving distance calculation unit;
     a moving angle calculation unit configured to calculate a moving angle of the second ultrasonic sensor from the first timing to the second timing, with the position of the first ultrasonic sensor at the first timing as a center, based on the sensor interval calculated by the sensor interval calculation unit; and
     an obstacle direction calculation unit configured to calculate a direction of the obstacle with respect to the second ultrasonic sensor at the second timing based on the first distance information, the second distance information, the sensor interval calculated by the sensor interval calculation unit, and the moving angle calculated by the moving angle calculation unit.

2. The obstacle detection system for vehicle according to claim 1, further comprising a communication unit including a communication interface and configured to transmit position information that indicates the position calculated by the operation unit to the outside of the obstacle detection system for vehicle.

3. The obstacle detection system for vehicle according to claim 2, wherein the communication unit is configured to transmit the position information to the outside of the obstacle detection system for vehicle using controller area network communication.

4. The obstacle detection system for vehicle according to claim 3, wherein the communication unit is configured to transmit the position information to an Electronic Control Unit disposed in the vehicle.

5. The obstacle detection system for vehicle according to claim 3, further comprising:
   a prediction unit configured to predict a traveling route of the vehicle based on a steering angle of the vehicle; and
   a determination unit configured to determine whether the position calculated by the operation unit is included in the traveling route predicted by the prediction unit.

6. The obstacle detection system for vehicle according to claim 2, wherein the communication unit is configured to transmit the position information to the outside of the obstacle detection system for vehicle using a serial interface.

7. The obstacle detection system for vehicle according to claim 6, wherein the communication unit is configured to transmit the position information to an Electronic Control Unit disposed in the vehicle.

8. The obstacle detection system for vehicle according to claim 2, wherein the communication unit is configured to transmit the position information to an Electronic Control Unit disposed in the vehicle.

9. The obstacle detection system for vehicle according to claim 2, further comprising:
   a prediction unit realized by the processor and configured to predict a traveling route of the vehicle based on a steering angle of the vehicle; and
   a determination unit realized by the processor and configured to determine whether the position calculated by the operation unit is included in the traveling route predicted by the prediction unit, wherein
   the communication unit is configured to transmit the position information to the outside when the determination unit determines that the position is included in the traveling route,
   the communication unit being configured not to transmit the position information to the outside of the obstacle detection system for vehicle when the determination unit determines that the position is not included in the traveling route.

10. The obstacle detection system for vehicle according to claim 2, further comprising:
    a prediction unit configured to predict a traveling route of the vehicle based on a steering angle of the vehicle; and
    a determination unit configured to determine whether the position calculated by the operation unit is included in the traveling route predicted by the prediction unit.

11. The obstacle detection system for vehicle according to claim 1, further comprising:
    a prediction unit realized by the processor and configured to predict a traveling route of the vehicle based on a steering angle of the vehicle; and
    a determination unit realized by the processor and configured to determine whether the position calculated by the operation unit is included in the traveling route predicted by the prediction unit.

12. The obstacle detection system for vehicle according to claim 1, further comprising a coordinate calculation unit realized by the processor and configured to calculate positional coordinates of the obstacle at the second timing based on the sensor interval and the direction calculated by the obstacle direction calculation unit.

13. The obstacle detection system for vehicle according to claim 1, wherein the operation unit is configured to calculate the position of the obstacle at a third timing which is later than the second timing, after calculating the position at the second timing, using the second distance information, and third distance information on the first distance measured by the first ultrasonic sensor at the third timing.

14. The obstacle detection system for vehicle according to claim 1,
  wherein the first ultrasonic sensor further comprises a first housing that houses the first microphone, and
  wherein the second ultrasonic sensor further comprises a second housing that houses the second microphone.

15. The obstacle detection system for vehicle according to claim 1, wherein the operation unit is disposed in the vehicle.

\* \* \* \* \*